(12) United States Patent
Kirillov et al.

(10) Patent No.: US 12,468,147 B2
(45) Date of Patent: Nov. 11, 2025

(54) MULTI-BEAM LASER BEAM SCANNER IN A PICTURE GENERATION UNIT

(71) Applicant: Infineon Technologies AG, Neubiberg (DE)

(72) Inventors: Boris Kirillov, Gratwein-Straßengel (AT); Maximilian Werner, Fischach (DE); Roland Richter, Puchheim (DE)

(73) Assignee: Infineon Technologies AG, Neubiberg (DE)

( * ) Notice: Subject to any disclaimer, the term of this patent is extended or adjusted under 35 U.S.C. 154(b) by 599 days.

(21) Appl. No.: 17/929,381

(22) Filed: Sep. 2, 2022

(65) Prior Publication Data

US 2024/0077719 A1    Mar. 7, 2024

(51) Int. Cl.
*G02B 26/08* (2006.01)
*G02B 26/10* (2006.01)
*G02B 26/12* (2006.01)
*H04B 10/50* (2013.01)

(52) U.S. Cl.
CPC ....... *G02B 26/123* (2013.01); *G02B 26/0833* (2013.01); *G02B 26/101* (2013.01); *H04B 10/50* (2013.01)

(58) Field of Classification Search
CPC ............. G02B 26/123; G02B 26/0833; G02B 26/101; G02B 27/0101; G02B 26/10; H04B 10/50
See application file for complete search history.

(56) References Cited

U.S. PATENT DOCUMENTS

2018/0286320 A1* 10/2018 Tardif .................. G02B 26/101
2018/0295331 A1* 10/2018 Tardif .................. G02B 26/105

* cited by examiner

*Primary Examiner* — Euncha P Cherry
(74) *Attorney, Agent, or Firm* — Harrity & Harrity, LLP

(57) ABSTRACT

A picture generation system includes a plurality of red-green-blue (RGB) light transmitters configured to synchronously generate respective pixel light beams and transmit the respective pixel light beams along respective transmission paths to be projected into a full field of view (FOV). The full FOV is divided into a plurality of FOV sections that are respectively paired with a different one of the plurality of RGB light transmitters such that each of the plurality of RGB light transmitters transmits light into a respective area defined by its respective FOV section. The picture generation system further includes a scanning system arranged on each of the respective transmission paths of the plurality of RGB light transmitter. The scanning system includes a scanning structure that enables the scanning system to simultaneously steer the respective pixel light beams into the plurality of FOV sections.

23 Claims, 5 Drawing Sheets

MULTI-BEAM LASER BEAM SCANNER IN A PICTURE GENERATION UNIT

BACKGROUND

Augmented reality (AR) is a technology that augments physical environments on a mobile device screen by overlaying them with digital content. It adds digital elements to a live view. For example, a captured piece of an environment is augmented with digital information that is superimposed thereon. Thus, digital content is overlaid onto the captured piece of the environment to visually provide additional information to a user. The digital content may be displayed on a transparent substrate or display, such as smart eyeglasses, smart contact lenses, head-up displays (HUDs), and head-mounted displays (HMDs), or projected directly onto a user's retina, as is the case for virtual retinal displays.

Virtual reality (VR) is a technology that entirely replaces the real-world environment of a user with a computer-generated virtual environment. Thus, a user is presented with a completely digital environment. In particular, computer-generated stereo visuals entirely surround the user. In a VR simulated environment, a VR headset that provides 360-degree vision may be used.

A mixed reality (MR) experience combines elements of both AR and VR such that real-world and digital objects interact. Here, a real-world environment is blended with a virtual one.

These technologies, as well as others that enhance a user's senses, may be referred to as extended reality (XR) technologies.

SUMMARY

One or more implementations provide a picture generation system that includes: a plurality of red-green-blue (RGB) light transmitters configured to synchronously generate respective pixel light beams and transmit the respective pixel light beams along respective transmission paths to be projected into a full field of view (FOV), wherein the full FOV is divided into a plurality of FOV sections that are respectively paired with a different one of the plurality of RGB light transmitters such that each of the plurality of RGB light transmitters transmits light into a respective area defined by a respective FOV section of the plurality of FOV sections; and a scanning system arranged on each of the respective transmission paths of the plurality of RGB light transmitters, the scanning system comprising at least one scanning structure that enables the scanning system to simultaneously steer the respective pixel light beams into the plurality of FOV sections, wherein the scanning system is configured to direct each of the respective pixel light beams into a different one of the plurality of FOV sections according to a scanning pattern.

One or more implementations provide a method of generating a picture on a full field of view (FOV). The method includes: synchronously transmitting, by a plurality of red-green-blue (RGB) light transmitters, respective pixel light beams along respective transmission paths to be projected into the full FOV, wherein the full FOV is divided into a plurality of FOV sections that are respectively paired with a different one of the plurality of RGB light transmitters such that each of the plurality of RGB light transmitters transmits light into a respective area defined by a respective FOV section of a plurality of FOV sections; and simultaneously steering, by a scanning system, the respective pixel light beams into the plurality of FOV sections, including directing each of the respective pixel light beams into a different one of the plurality of FOV sections according to a scanning pattern.

BRIEF DESCRIPTION OF THE DRAWINGS

Implementations are described herein making reference to the appended drawings.

DETAILED DESCRIPTION

Figure 1A:
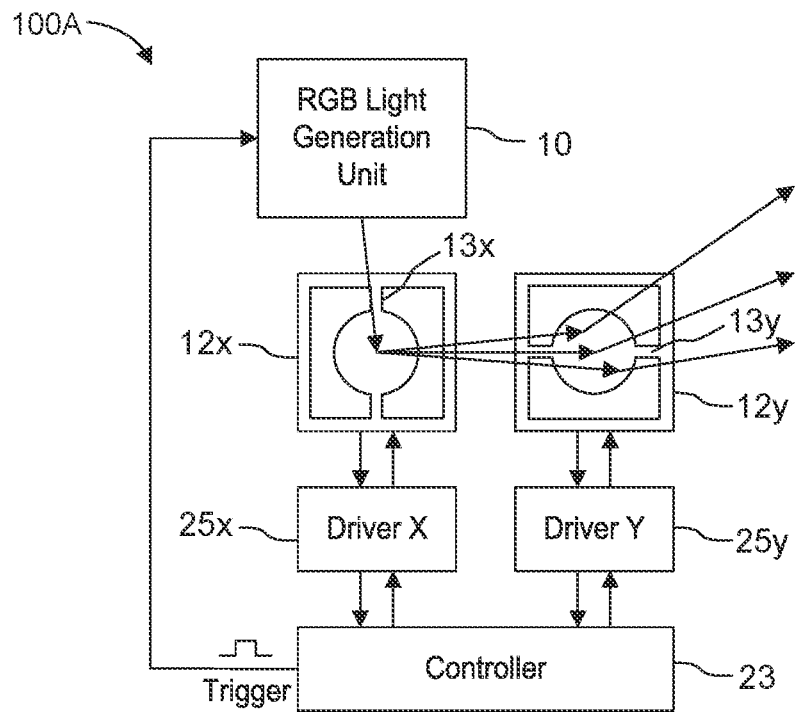
FIGS. 1A and 1B are schematic block diagrams of 2D scanning systems according to one or more implementations.

In the following, various implementations will be described in detail referring to the attached drawings. It should be noted that these implementations serve illustrative purposes only and are not to be construed as limiting. For example, while implementations may be described as comprising a plurality of features or elements, this is not to be construed as indicating that all these features or elements are needed for implementing implementations. Instead, in other implementations, some of the features or elements may be omitted, or may be replaced by alternative features or elements. Additionally, further features or elements in addition to the ones explicitly shown and described may be provided, for example conventional components of sensor devices.

Features from different implementations may be combined to form further implementations, unless specifically noted otherwise. Variations or modifications described with respect to one of the implementations may also be applicable to other implementations. In some instances, well-known structures and devices are shown in block diagram form rather than in detail in order to avoid obscuring the implementations.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Lissajous scanning is a type of scanning implemented in display applications, light scanning applications, and light steering applications, to name a few. For example, Lissajous scanning may be used in displays, Light Detection and Ranging (LIDAR), and automotive headlights in which light beams are steered by a scanning system according to a Lissajous pattern. Lissajous scanning is typically done by two resonant scanning axes which are each driven at constant scanning frequency with a defined frequency ratio/difference therebetween that forms a specific Lissajous pattern and frame rate. In order to properly carry out Lissajous scanning, synchronization of the two scanning axes is performed.

Lissajous scanning may be used in extended reality (XR) technologies. For example, augmented reality (AR) is a technology that augments physical environments on a mobile device screen by overlaying the physical environments with digital content. AR adds digital elements to a live view. For example, a captured piece of an environment is augmented with digital information that is superimposed thereon. Thus, digital content is overlaid onto the captured piece of the environment to visually provide additional information to a user. The digital content may be displayed on a transparent substrate or display, such as smart eyeglasses, smart contact lenses, head-up displays (HUDs), and head-mounted displays (HMDs), or projected directly onto a user's retina, as is the case for virtual retinal displays. Virtual reality (VR) is a technology that entirely replaces the real-world environment of a user with a computer-generated virtual environment. Thus, a user is presented with a completely digital environment in which computer-generated stereo visuals surround the user. In a VR simulated environment, a VR headset that provides 360-degree vision may be used. A mixed reality (MR) experience combines elements of both AR and VR such that real-world and digital objects interact. Here, a real-world environment is blended with a virtual one. These technologies, as well as others that enhance a user's senses, may be referred to as XR technologies.

There are several devices that are enabling AR, VR, MR, and XR technologies. A microelectromechanical system (MEMS) mirror-based laser beam scanner is one of these devices. A red-green-blue (RGB) laser beam produced by red laser diode, a green laser diode, and a blue laser diode of an RGB light generation unit is scanned by a mirror to project an image over an entire field of view (FOV) that defines a projected image. The laser beam scanner is capable of delivering small form factor and low power consumption at a relatively low system cost. However, laser diodes of the RGB light generation unit are limited in power. As a result, the brightness of an image generated by the RGB light generation unit is limited. However, some applications rely on an image brightness that is greater than 12000 nits, which is difficult to achieve using a single RGB laser beam scanned over the entire FOV. For example, producing an image brightness that is greater than 12000 nits results in a laser-power yield of several hundreds of mW per laser diode, which is not achievable with current laser diodes.

Some implementations, described herein, relate to optical transmitters, optical scanners, and optical scanner systems configured to transmit light beams or pulses according to a scanning pattern, such as according to a two-dimensional (2D) scanning pattern (e.g., a Lissajous scanning pattern). Light beams include visible light, infrared (IR) light, or other type of illumination signals. In some applications, the transmitted light may be scanned across an intended field of view (FOV), also referred to as a field of illumination, or a section of the field of view.

In some applications, the transmitted light may be backscattered by an object back towards the system where the backscattered light is detected by a sensor. The sensor may convert the received backscattered light into an electric signal, such as a current signal or a voltage signal, that may be further processed by the system to generate object data and/or an image.

As described herein, multiple light generation units are used with an entire FOV that is divided into multiple FOV sections. Each light generation unit is assigned to a different FOV section and, in combination with a MEMS-based laser beam scanner, is responsible for scanning within its FOV section. The overall transmitted energy scales in direct proportion with the number of light generation units. As a result, the image brightness also scales in direct proportion with the number of light generation units. Thus, any brightness requirement can be fulfilled with the use of an appropriate number of RGB light generation units. Furthermore, a higher resolution can be achieved since each light generation unit needs to cover only a fraction of entire FOV (i.e., only a fraction of the entire projected image). In addition, a larger field of view can be achieved using a same mechanical tilt-angle of the MEMS-based laser beam scanner. Accordingly, the disclosed MEMS-based laser beam scanner is capable of delivering small form factor, low power consumption, and high brightness at a relatively low system cost while also fulfilling any brightness requirement with the use of an appropriate number of RGB light generation units.

Figure 1B:
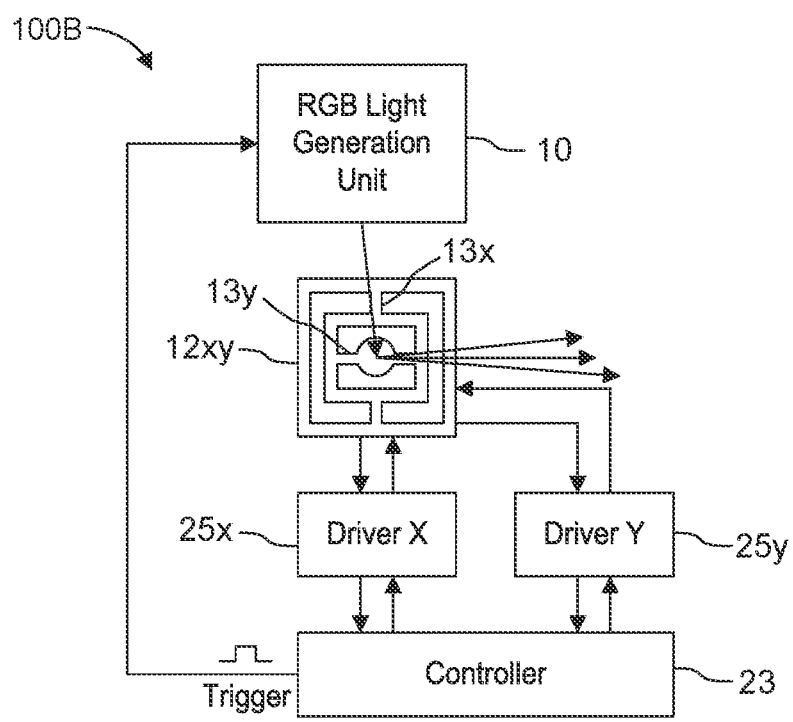

FIGS. 1A and 1B are schematic block diagrams of 2D scanning systems 100A and 100B, respectively, according to one or more implementations. In particular, the 2D scanning system 100A includes two one-dimensional (1D) MEMS mirrors 12x and 12y that are used to steer or otherwise deflect light beams (e.g., light pulses) according to a 2D scanning pattern (e.g., a Lissajous scanning pattern). In contrast, the 2D scanning system 100B includes a single two-dimensional (2D) MEMS mirror 12xy that is used to steer or otherwise deflect light beams according to a 2D scanning pattern.

A scan, such as an oscillating horizontal scan (e.g., from left to right and right to left of a field of view), an oscillating vertical scan (e.g., from bottom to top and top to bottom of a field of view), or a combination thereof (e.g., a Lissajous scan), can illuminate an area referred to as the "field of view" in a continuous scan fashion. Each firing of the laser beam by the light sources can result in a scan line in the field of view. By emitting successive light beams in different scanning directions, an image can be projected into the field of view, as is the case in XR technologies. In other words, the field of view can be illuminated by a scanning operation. In general, an entire field of view is the full scanning area defined by the full range of motion of a MEMS mirror at which the MEMS mirror is driven. Thus, the entire field of view is delineated by a left edge, a right edge, a bottom edge, and a top edge. The entire field of view can also be referred to as a projection area in a projection plane onto which an image is projected.

In the example shown in FIG. 1A, the MEMS mirrors 12x and 12y are mechanical moving mirrors (e.g., MEMS micromirrors) integrated on a semiconductor chip (not shown). A MEMS mirror according to one or more implementations described herein is configured to rotate or oscillate via rotation about either a single scanning axis (e.g., a 1D MEMS mirror) or two scanning axes (e.g., a 2D MEMS mirror) that are typically orthogonal to each other. A rotation of the MEMS mirror on a scanning axis may be performed between two predetermined extremum deflection angles (e.g., +/−5 degrees, +/−15 degrees, etc.). A 2D scanner is configured to control the steering of the light beams in two dimensions (e.g., in a horizontal x-direction and in a vertical y-direction).

In the example shown in FIG. 1A, two 1D MEMS mirrors $12x$ and $12y$ are used to steer light beams in two dimensions. MEMS mirror $12x$ includes a first scanning axis $13x$ that enables the MEMS mirror $12x$ to steer light in the x-direction, whereas MEMS mirror $12y$ includes a second scanning axis $13y$ that enables the MEMS mirror $12y$ to steer light in the y-direction. The two MEMS mirrors $12x$ and $12y$ are arranged sequentially along a transmission path of the light beams such that one of the MEMS mirrors (e.g., MEMS mirror $12x$) first receives a light beam and steers the light beam in a first dimension and the second one of the MEMS mirrors (e.g., MEMS mirror $12y$) receives the light beam from the first MEMS mirror and steers the light beam in a second dimension. As a result, the two MEMS mirrors $12x$ and $12y$ operate together to steer a light beam generated by a red-green-blue (RGB) light generation unit 10 in two-dimensions. In this way, the two MEMS mirrors $12x$ and $12y$ can direct a light beam at a desired 2D coordinate (e.g., an x-y coordinate) in the field of view. Multiple light beams can be steered by the two MEMS mirrors $12x$ and $12y$ at different 2D coordinates of a scanning pattern. Thus, the field of view is scanned in both scanning directions by changing the angle θ of each MEMS mirror $12x$ and $12y$ on its respective scanning axis.

In the example shown in FIG. 1B, a single 2D MEMS mirror $12xy$ is used to steer light beams in two dimensions. MEMS mirror $12xy$ includes the first scanning axis $13x$ that enables the MEMS mirror $12xy$ to steer light in the x-direction and the second scanning axis $13y$ that enables the MEMS mirror $12xy$ to steer light in the y-direction. In this way, a single MEMS mirror can steer light beams received from the RGB light generation unit 10 in both the x-direction and the y-direction. As a result, the MEMS mirror $12xy$ can direct a light beam at a desired 2D coordinate (e.g., an x-y coordinate) in the field of view. A particular 2D coordinate may correspond to an image pixel. Multiple light beams can be steered by the MEMS mirror $12xy$ at different 2D coordinates of a scanning pattern. Thus, the field of view is scanned in both scanning directions by changing the angle θ of deflection of the MEMS mirror $12xy$ on its respective scanning axes.

Each MEMS mirror $12x$, $12y$, $12xy$ can be a resonator (e.g., a resonant MEMS mirror) configured to oscillate "side-to-side" about each of its scanning axes at a resonance frequency such that the light reflected from the MEMS mirror $12x$, $12y$, $12xy$ oscillates back and forth in a scanning direction of a respective scanning axis. Different resonance frequencies may be used for each scanning axis $13x$ and $13y$ for defining the scanning pattern. Each MEMS mirror $12x$, $12y$, $12xy$ could also be a non-resonant mirror, depending on the application.

For each scanning axis, the MEMS mirrors $12x$, $12y$, $12xy$ includes an actuator structure used to drive the MEMS mirror $12x$, $12y$, $12xy$ about its respective scanning axis. The actuator structure may include interdigitated finger electrodes made of interdigitated mirror combs and frame combs to which a drive voltage (e.g., an actuation signal or driving signal) is applied by a MEMS driver $25x$ or $25y$. Applying a difference in electrical potential between interleaved mirror combs and frame combs creates a driving force between the mirror combs and the frame combs, which creates a torque on the mirror body about the intended scanning axis. The drive voltage can be toggled between two voltages resulting in an oscillating driving force. The oscillating driving force causes the MEMS mirror $12x$, $12y$, $12xy$ to oscillate back and forth on its scanning axis between two extrema. Depending on the configuration, this actuation can be regulated or adjusted by adjusting the drive voltage off time, a voltage level of the drive voltage, or a duty cycle.

In other examples, the MEMS mirrors $12x$, $12y$, and $12xy$ may use other actuation methods to drive the mirror about its respective scanning axis. For example, these other actuation methods may include electromagnetic actuation and/or piezoelectric actuators. In electromagnetic actuation, a MEMS mirror $12x$, $12y$, or $12xy$ may be "immersed" in a magnetic field and an alternating electric current through conductive paths may create the oscillating torque around the scanning axis. Piezoelectric actuators may be integrated in the leaf springs or the leaf springs may be made of piezoelectric material to produce alternating beam bending forces in response to an electrical signal and generate the oscillation torque.

The 2D scanning systems 100A and 100B each includes multiple red-green-blue (RGB) light generation units (e.g., RGB light transmitters), although only a single RGB light generation unit 10 is shown in the examples of FIGS. 1A and 1B for the sake of simplicity. The RGB light generation unit 10 includes a red laser diode or light emitting diode for generating a red light beam, a green laser diode or light emitting diode for generating a green light beam, a blue laser diode or light emitting diode for generating a blue light beam, and optical elements that combine the three colored light beams into a single RGB light beam for output from the RGB light generation unit 10. Accordingly, each RGB light generation unit 10 outputs a respective RGB light beam along a respective transmission path towards the MEMS mirror(s) $12x$, $12y$, or $12xy$. Each respective RGB light beam may be generated as a light pulse and each RGB light generation unit 10 may sequentially transmit multiple RGB light beams according to a trigger signal received from a system controller 23.

It is to be noted that, while one, two, or all three of the R, G, B light sources of a particular RGB light generation unit 10 may be triggered for a light transmission, the output light beam is still referred to as an RGB light beam. Alternatively, an "RGB light beam" may be referred to as a "pixel light beam" that includes one or more colors of light depending on the desired pixel color to be projected onto the FOV. Thus, the terms "RGB light beam" and "pixel light beam" can be used interchangeably.

As will be described in greater detail below, each RGB light generation unit 10 is configured to scan only an assigned section of the entire FOV. In other words, the entire FOV is divided into multiple FOV sections (e.g., sub-fields) and each RGB light generation unit 10 is respectively assigned to one of the FOV sections. For example, if the entire FOV is divided into N FOV sections or sub-fields, with N>1, each RGB light generation unit 10 scans only 1/N of the entire FOV.

In some implementation, an FOV section may partially overlap with another, neighboring FOV section. In some implementations, all FOV sections may be mutually exclusive of each other. In some implementations, neighboring FOV sections may share a common boundary. In some implementations, the boundaries of neighboring FOV sections may be separated by a gap. Thus, a particular RGB light generation unit 10 is responsible for scanning or projecting light into its assigned FOV section and its transmitted light beams do not deviate outside of its assigned FOV section. The multiple RGB light generation units 10 are arranged with respect to the MEMS mirror(s) 12$x$, 12$y$, or 12$xy$ at a unique angle and/or position such that its RGB light beams are reflected into its assigned FOV section. The overall transmitted energy scales in direct proportion with the number of RGB light generation units 10. As a result, the image brightness also scales in direct proportion with the number of RGB light generation units 10. Thus, any brightness requirement can be fulfilled with the use of an appropriate number of RGB light generation units 10. Furthermore, a higher resolution can be achieved since each RGB light generation unit 10 needs to cover only a fraction of the projected image. In addition, a larger field of view can be achieved using a same mechanical tilt-angle of the MEMS mirror(s) 12$x$, 12$y$, or 12$xy$.

The system controller 23 is configured to control components of the scanning systems 100A and 100B. In certain applications, the system controller 23 may also be configured to receive programming information with respect to a 2D scanning pattern and control a timing of sequentially transmitted RGB light beams based on the programming information. Thus, the system controller 23 includes a processor and/or a controller that is configured to generate control signals.

As noted above, the system controller 23 is configured to generate a trigger signal used to trigger each RGB light generation unit 10 to generate RGB light beams. As will be described in further detail, each RGB light generation unit 10 is synchronously (e.g., simultaneously) triggered along with the other RGB light generation unit(s) 10 to generate a respective RGB light beam. Thus, multiple RGB light beams are generated simultaneously by the multiple RGB light generation units 10 and directed towards MEMS mirrors 12$x$ and 12$y$ or MEMS mirror 12$xy$. Thus, the system controller 23 controls the timing that the light beams are fired from the each RGB light generation unit 10 via the trigger signal.

The system controller 23 is also configured to set a driving frequency of a MEMS mirror 12$x$, 12$y$, or 12$xy$ for each of its scanning axes and is capable of synchronizing the oscillations about the two scanning axes 13$x$ and 13$y$. In particular, the system controller 23 is configured to control an actuation of a MEMS mirror 12$x$, 12$y$, or 12$xy$ about each scanning axis by controlling a driving signal. The system controller 23 may control a frequency, a phase, a duty cycle, a high-voltage (HV) level, and/or a low-voltage (LV) level of the driving signal to control the actuation. The actuation of a MEMS mirror 12$x$, 12$y$, or 12$xy$ about a particular scanning axis controls its range of motion and scanning rate about that particular scanning axis.

The 2D scanning systems 100A and 100B both include a MEMS driver 25$x$ for driving a MEMS mirror (e.g., MEMS mirror 12$x$ or 12$xy$) about the first scanning axis 13$x$ and a MEMS driver 25$y$ for driving a MEMS mirror (e.g., MEMS mirror 12$y$ or 12$xy$) about the second scanning axis 13$y$. Each MEMS driver 25$x$, 25$y$ actuates and senses the rotation position of a MEMS mirror 12$x$, 12$y$, or 12$xy$ about its respective scanning axis, and provides position information (e.g., tilt angle or degree of rotation about the scanning axis) of the MEMS mirror 12$x$, 12$y$, or 12$xy$ to the system controller 23. Based on this position information, the light sources of each RGB light generation unit 10 may be triggered by the system controller 23. Thus, a higher accuracy in position sensing of the MEMS mirror results in a more accurate and precise control of other components of the 2D scanning systems 100A and 100B.

As noted above, a drive voltage (e.g., an actuation signal or driving signal) is applied by a MEMS driver 25$x$ or 25$y$ to an actuator structure of the MEMS mirror that corresponds to its corresponding scanning axis to drive the oscillation of the MEMS mirror about that scanning axis. The drive voltage can be switched or toggled between an HV level and an LV level resulting in an oscillating driving force. The LV level of the drive voltage is zero when the drive voltage is off but may also be a non-zero value. When the drive voltage is toggled between an HV level and an LV level and the LV level is set to zero, it can be said that the drive voltage is toggled on and off (HV on/off). The oscillating driving force causes the mirror to oscillate back and forth on its scanning axis between two extrema. The drive voltage may be a constant drive voltage, meaning that the drive voltage is the same voltage when actuated (e.g., toggled on) or one or both of the HV and LV levels of the drive voltage may be adjustable. However, it will be understood that the drive voltage is being toggled between HV and LV levels in order to produce the mirror oscillation. Depending on the configuration, this actuation can be regulated or adjusted by adjusting the drive voltage off time, a voltage level of the drive voltage, or a duty cycle. As noted above, frequency and phase of the drive voltage can also be regulated and adjusted.

Hence, a light transmission technique includes transmitting the light beams into the field of view from one or two MEMS mirrors that use two scanning axes to transmit according to a 2D scanning pattern. The MEMS mirrors may continuously oscillate in resonance about each scanning axis such that the light beams are projected into the field of view that moves across the field of view as the 2D scanning system changes the transmission direction.

To make the Lissajous pattern reproduce itself periodically with a frame rate frequency [Hz], two resonant scanning axes are each driven at a target scanning frequency f1, f2 with a defined frequency ratio or defined frequency difference therebetween that forms a repeatable Lissajous pattern (frame) with a frame rate. A new frame begins each time the Lissajous pattern restarts, which occurs when a phase difference between a mirror phase about scanning axis 13$x$ and a mirror phase about scanning axis 13$y$ is zero. The system controller 23 synchronizes the oscillations about the two resonant scanning axes to ensure this defined frequency ratio or defined frequency difference is maintained based on the position information received from the MEMS drivers 25$x$ and 25$y$.

As indicated above, FIGS. 1A and 1B are provided merely as examples with a single RGB light generation unit 10. In practice, two or more RGB light generation units 10 that transmit RGB light beams at MEMS mirrors 12$x$, 12$y$, or 12$xy$ are used. In addition, it is conceivable that other types of light generation units capable of generating pixel light beams may be used. Furthermore, two or more devices shown in FIG. 1A or FIG. 1B may be implemented within a single device, or a single device shown in FIG. 1A or FIG. 1B may be implemented as multiple, distributed devices. Additionally, one or more of the devices of 2D scanning system 100A and/or 100B may perform one or more functions described as being performed by another one or more devices of 2D scanning system 100A and/or 100B.

Figure 2:
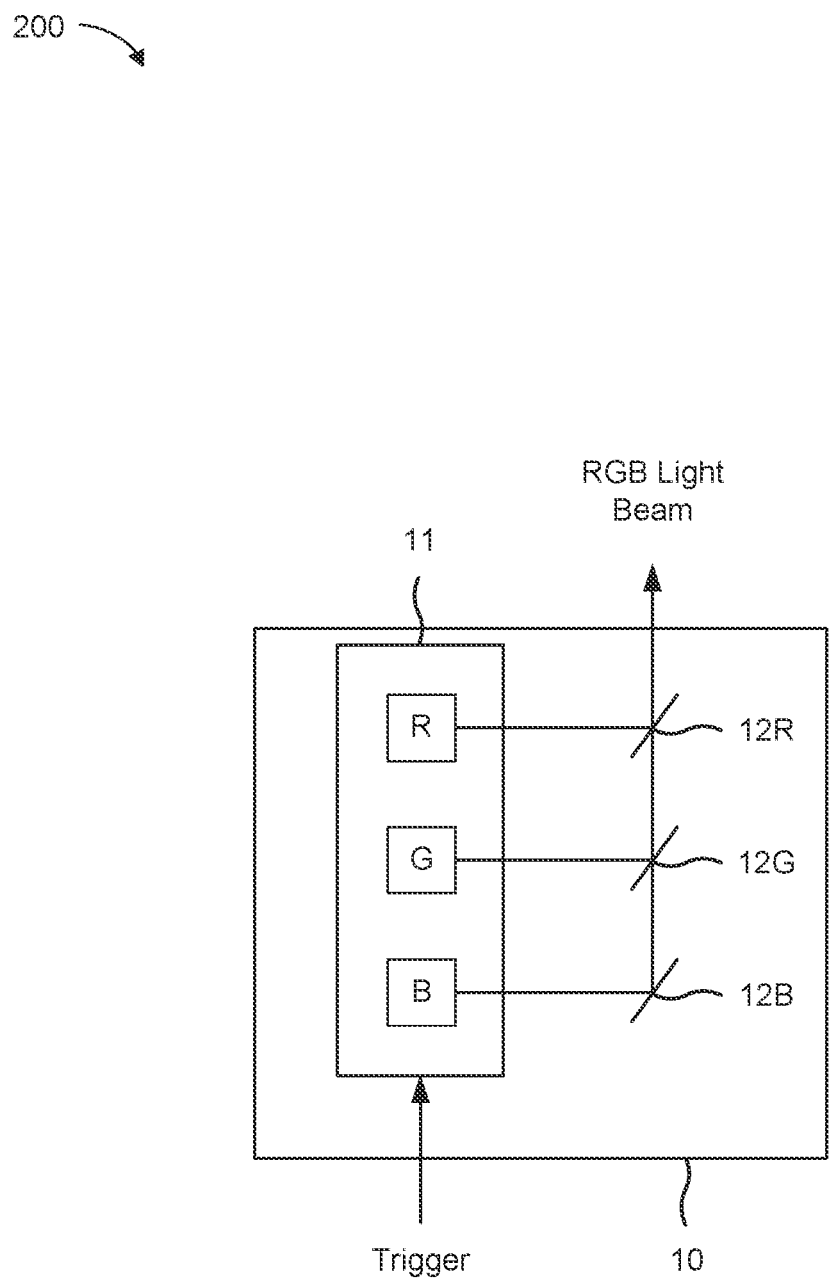
FIG. 2 shows a light generation unit according to one or more implementations.

FIG. 2 shows a light generation unit 10 according to one or more implementations. The light generation unit 10 is an RGB light generation unit that includes an RGB light source 11. The RGB light source 11 includes a red light source R for generating a red light beam, a green light source G for generating a green light beam, a blue light source B for generating a blue light beam, and optical elements 12R, 12G, and 12B that combine the three colored light beams into a single RGB light beam for output from the RGB light generation unit 10. In the case that two or more red, green, and blue light sources are activated to produce an RGB light beam, the activated light sources are simultaneously triggered by the system controller 23 and the RGB light beam is directed towards the MEMS mirrors 12x and 12y or towards MEMS mirror 12xy, as shown in FIGS. 1A and 1B.

The optical elements 12R, 12G, and 12B may be optical beam splitters or optical mirrors that couple the respective colored light beams into a combined transmission path. The optical elements 12R, 12G, and 12B may have a high reflectivity with respect to their respective colored light beam. Other colored light beams may pass through one or more optical elements 12R, 12G, and 12B that has a high transmittivity with respect to those colors (e.g., those wavelength regions). For example, a front side of an optical element 12R, 12G, or 12B may reflect its respective colored light beam and a back side of the optical element 12R, 12G, or 12B may allow other colored light beams to pass therethrough. The MEMS mirrors 12x and 12y of FIG. 1A or the MEMS mirror 12xy of FIG. 1B are configured to receive RGB light beams and steer the RGB light beams in a 2D projection plane using the two scanning axes to create an RGB image.

As indicated above, FIG. 2 is provided merely as an example. Other examples are possible and may differ from what was described with regard to FIG. 2. For example, in some implementations, a different arrangement of optical elements may be used to combine colored light beams into an RGB light beam. In addition, it is conceivable that other types of light generation units capable of generating pixel light beams may be used.

Figure 3:
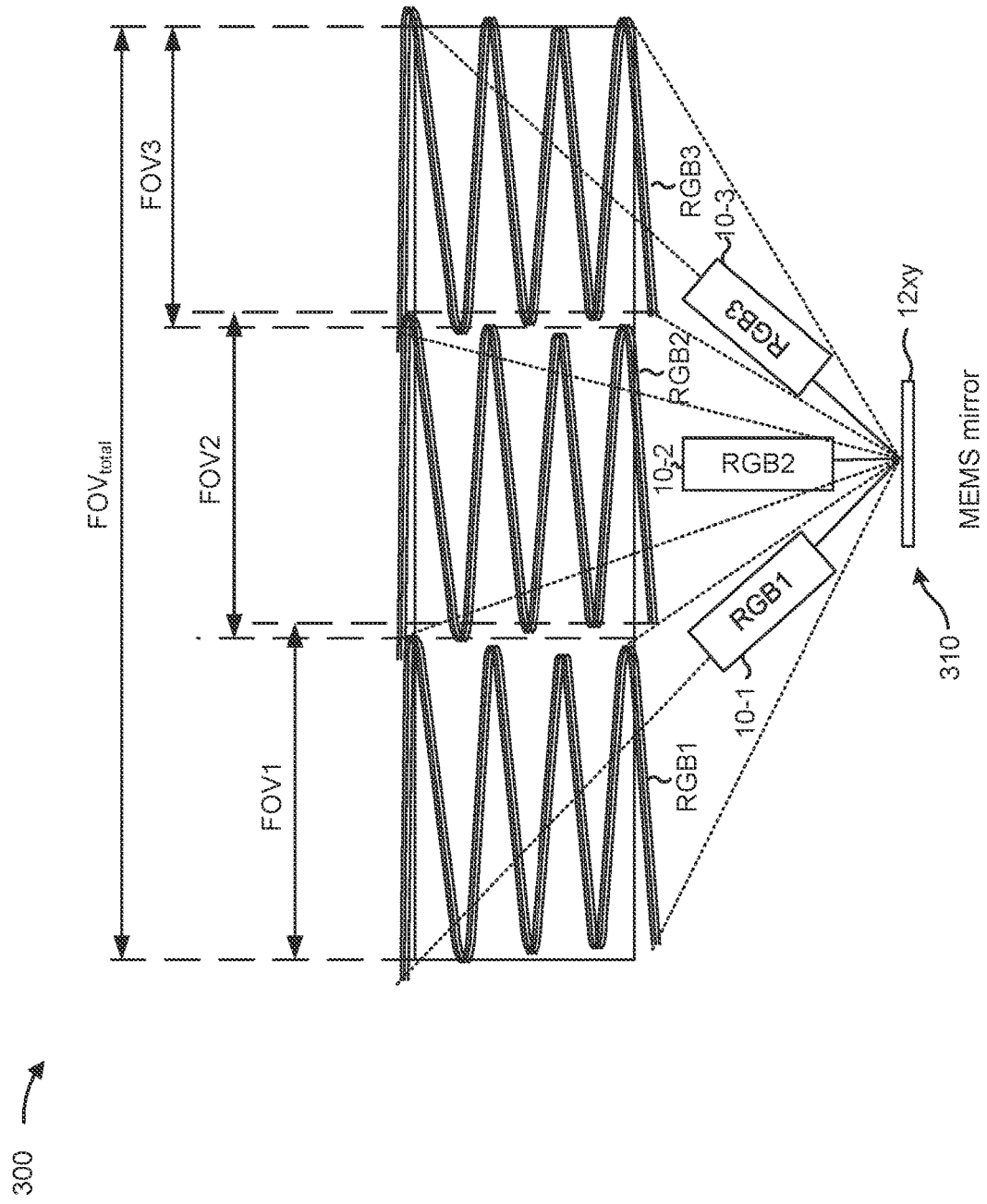
FIG. 3 shows an image projection system according to one or more implementations.

FIG. 3 shows an image projection system 300 according to one or more implementations. The image projection system 300 is configured to project images into a total field of view FOVtotal for generating a picture in a projection plane of the total field of view FOVtotal. In other words, the image projection system 300 illuminates the total field of view FOVtotal with RGB light beams during a scanning operation.

The total field of view FOVtotal is divided into N FOV sections, wherein N is greater than one. In the example of FIG. 3, the total field of view FOVtotal is divided into three FOV sections FOV1, FOV2, and FOV3 that are arranged horizontally across the total field of view FOVtotal. In some implementations, the FOV sections FOV1, FOV2, and FOV3 could be arranged vertically across the total field of view FOVtotal. In some implementations, the FOV sections FOV1, FOV2, and FOV3 could be arranged diagonally with respect to each other. In some implementations, the FOV sections FOV1, FOV2, and FOV3 could be arranged in a checkered pattern. In the example of FIG. 3, neighboring FOV sections overlap to provide a seamless transition between FOV sections. However, in some implementations, neighboring FOV sections could share a common boundary (e.g., left and right respective edges are colinear). In some implementations, neighboring FOV sections could be separated by a gap. Having an overlap or a shared common boundary between neighboring FOV sections may provide a more a uniform image across the total field of view FOVtotal. Having no overlap or shared common boundary between neighboring FOV sections may enable the projected images to be extended across a wider area or may allow separate and distinct images to be displayed.

The image projection system 300 includes a 2D MEMS mirror scanning system 310 that includes two 1D MEMS mirrors 12x and 12y, as shown in FIG. 1A, or one 2D MEMS mirror 12xy, as shown in FIG. 1B. In this example, MEMS mirror 12xy is provided for illustrative purposes.

The image projection system 300 further includes N RGB light generation units, including a first RGB light generation unit 10-1, a second RGB light generation unit 10-2, and a third RGB light generation unit 10-3. Each RGB light generation unit 10-1, 10-2, and 10-3 may have a similar structure described with regard to FIG. 2. Each RGB light generation unit 10-1, 10-2, and 10-3 is paired with one of the FOV sections FOV1, FOV2, and FOV3 and is configured to transmit a respective RGB light beam into its assigned FOV section via the 2D MEMS mirror scanning system 310. Thus, RGB light generation unit 10-1 is configured to transmit a first RGB light beam RGB1 into the first FOV section FOV1, RGB light generation unit 10-2 is configured to transmit a second RGB light beam RGB2 into the second FOV section FOV2, and RGB light generation unit 10-3 is configured to transmit a third RGB light beam RGB3 into the third FOV section FOV3.

The RGB light generation units 10-1, 10-2, and 10-3 are triggered simultaneously by the system controller 23 to simultaneously transmit their respective RGB light beams RGB1, RGB2, and RGB3 in parallel. Each of the RGB light generation units 10-1, 10-2, and 10-3 is arranged with respect to the 2D MEMS mirror scanning system 310 at a unique angle and/or position such that the RGB light beams generated by that particular RGB light generation unit 10-1, 10-2, or 10-3 are reflected into the assigned FOV section of that particular RGB light generation unit 10-1, 10-2, or 10-3. Because the RGB light beams RGB1, RGB2, and RGB3 are generated simultaneously and, thus, simultaneously directed at the 2D MEMS mirror scanning system 310, the 2D MEMS mirror scanning system 310 simultaneously steers the RGB light beams RGB1, RGB2, and RGB3 into their respective FOV sections FOV1, FOV2, and FOV3. Thus, the 2D MEMS mirror scanning system 310 includes at least one scanning structure that enables the 2D MEMS mirror scanning system 310 to simultaneously steer the RGB light beams RGB1, RGB2, and RGB3 into the plurality of FOV sections FOV1, FOV2, and FOV3. The 2D MEMS mirror scanning system 310 directs the RGB light beams RGB1, RGB2, and RGB3 into respective FOV sections FOV1, FOV2, and FOV3 according to a same scanning pattern.

During a scanning operation, each RGB light generation unit 10-1, 10-2, and 10-3 generates a sequence of RGB light beams, with the transmission sequences of the RGB light generation units 10-1, 10-2, and 10-3 being synchronous. Accordingly, the RGB light generation units 10-1, 10-2, and 10-3 transmit simultaneously at each transmission instance such that the transmission times of the RGB light generation units 10-1, 10-2, and 10-3 are synchronous.

For example, a first sequence of RGB light beams generated by RGB light generation unit 10-1 may be transmitted into FOV section FOV1 according to a Lissajous scanning pattern. A second sequence of RGB light beams generated by RGB light generation unit 10-2 may be transmitted into FOV section FOV2 according to the same Lissajous scanning pattern. A third sequence of RGB light beams generated by RGB light generation unit 10-3 may be transmitted into FOV section FOV3 according to the same Lissajous scanning pattern. The transmission timings of the first, second, and third sequences of RGB light beams may be synchronized by the system controller 23 such that the same 2D coordinate within the FOV sections FOV1, FOV2, and FOV3 is simultaneously targeted. In this way, the scanning of the FOV sections FOV1, FOV2, and FOV3 is completely synchronized.

As the 2D MEMS mirror scanning system 310 changes its transmission direction, different 2D coordinates are targeted. Targeted 2D coordinates within each of the FOV sections FOV1, FOV2, and FOV3 are synchronized such that respective RGB light beams RGB1, RGB2, and RGB3 are transmitted at a same 2D coordinate within each different FOV section FOV1, FOV2, and FOV3 at the same time. For example, if a top left corner of the first FOV section FOV1 is targeted by RGB light beam RGB1 in accordance with a transmission time of RGB light generation unit 10-1 and a position of the 2D MEMS mirror scanning system 310, the top left corners of the second FOV section FOV2 and the third FOV section FOV3 are similarly targeted by RGB light beams RGB2 and RGB3, respectively. If a center of the first FOV section FOV1 is targeted by RGB light beam RGB1 in accordance with a transmission time of RGB light generation unit 10-1 and a position of the 2D MEMS mirror scanning system 310, the centers of the second FOV section FOV2 and the third FOV section FOV3 are similarly targeted by RGB light beams RGB2 and RGB3, respectively.

Accordingly, each RGB light beam RGB1, RGB2, and RGB3 is scanned by the 2D MEMS mirror scanning system 310 to project an image into its respective FOV section. The projected images form a picture that spans across the total field of view FOVtotal. As a result, each light beam scans only 1/N of the total field of view FOVtotal, yet the synchronous scanning of multiple FOV sections by respective light beam sequences results in higher image brightness overall.

As indicated above, FIG. 3 is provided merely as an example. Other examples are possible and may differ from what was described with regard to FIG. 3. For example, in some implementations, the spatial arrangement of the FOV sections FOV1, FOV2, and FOV3 may be different. In some implementations, the quantity of RGB light generation units and respective FOV sections may be different. In some implementations, the arrangement of 2D MEMS mirror scanning system 310 may be different.

Figure 4A:
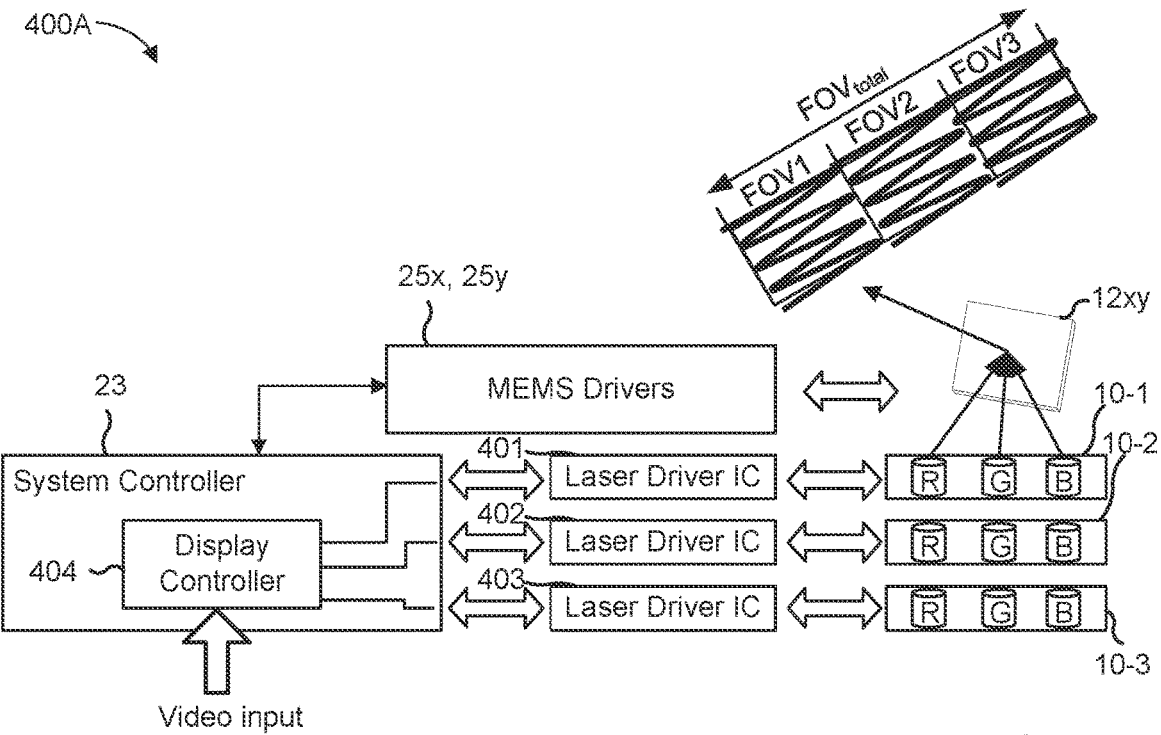
FIG. 4A shows a picture generation unit according to one or more implementations.

FIG. 4A shows a picture generation unit 400A according to one or more implementations. The picture generation unit 400A includes MEMS drivers 25x and 25y, MEMS mirror 12xy, multiple RGB light generation unit 10-1, 10-2, and 10-3, and system controller 23, as described above. The picture generation unit 400 further includes a laser driver IC for each RGB light generation unit 10-1, 10-2, and 10-3. Here, because three RGB light generation units 10-1, 10-2, and 10-3 are provided, three laser driver ICs 401, 402, and 403 are provided. Each laser driver IC 401, 402, and 403 is configured to drive one of the three RGB light generation units 10-1, 10-2, and 10-3 according to control information and/or a trigger signal received from the system controller 23.

The system controller 23 includes a display controller 404 that receives video input (e.g., video data) from a video source and generates control information based on the video input for controlling the laser driver ICs 401, 402, and 403. In some implementations, the video input may be received in the form of a video stream or a sequence of video frames where each video frame is a still image. The display controller 404 may divide the video input into different video segments corresponding to respective FOV sections FOV1, FOV2, and FOV3. In other words, the video input may be divided into N video segments, one video segment for each FOV section FOV1, FOV2, or FOV3. For example, the display controller 404 may divide a video frame or a still image into N segments, one segment for each FOV section FOV1, FOV2, and FOV3. A corresponding image of a video segment is scanned onto a respective FOV section FOV1, FOV2, or FOV3. When N images are simultaneously projected onto the entire FOV FOVtotal, an entire picture is generated.

The laser driver ICs 401, 402, and 403 receive the control information and control their respective RGB light generation units 10-1, 10-2, and 10-3 accordingly. For example, the laser driver ICs 401, 402, and 403 may control one or more properties of their respective RGB light generation unit 10-1, 10-2, and 10-3 for performing an RGB light beam transmission. The one or more properties may include an RGB value (e.g., pixel color) of the RGB light beam or brightness values of respective light sources within an RGB light generation unit 10-1, 10-2, or 10-3, for example. This includes controlling which light sources within an RGB light generation unit 10-1, 10-2, or 10-3 are triggered to generate an image pixel. For example, one, two, or all three R, G, B light sources may be triggered depending on the RGB value (e.g., pixel color) to be generated on a respective FOV section FOV1, FOV2, or FOV3 at a respective 2D coordinate. While only one or two of the R, G, B light sources of a particular RGB light generation unit 10-1, 10-2, and 10-3 may be triggered for a light beam transmission, the output light beam is still referred to as an RGB light beam. As noted above, an RGB light beam may alternatively be referred to as a pixel light beam. Thus, the RGB light generation units 10-1, 10-2, and 10-3 may generate the same or different colors during a same transmission timing depending on the divided video input and the transmitted pixel colors.

Figure 4B:
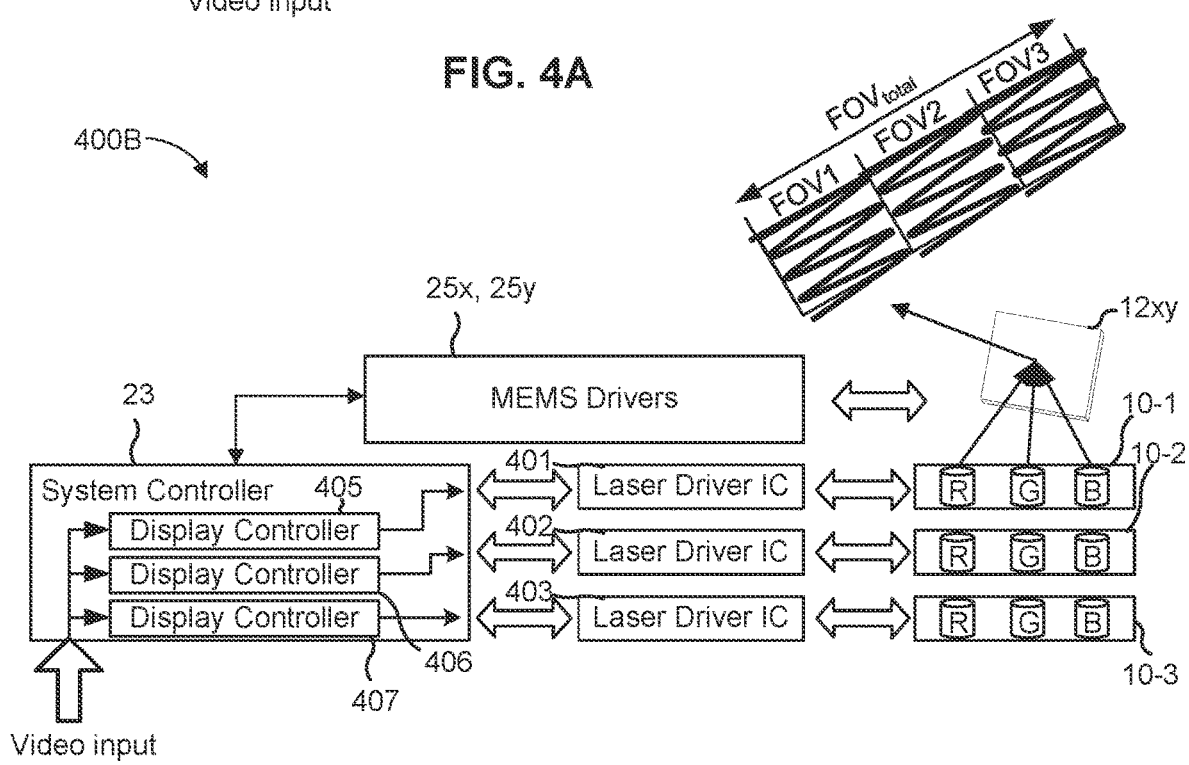
FIG. 4B shows a picture generation unit according to one or more implementations.

As indicated above, FIG. 4A is provided merely as an example. Other examples are possible and may differ from what was described with regard to FIG. 4A. For example, two or more devices shown in FIG. 4A may be implemented within a single device, or a single device shown in FIG. 4A may be implemented as multiple devices. Additionally, one or more of the devices of picture generation unit 400A may perform one or more functions described as being performed by another one or more devices of picture generation unit 400A FIG. 4B shows a picture generation unit 400B according to one or more implementations. The picture generation unit 400B is similar to the picture generation unit 400A shown in FIG. 4A with the exception that multiple display controllers 405, 406, and 407 are provided instead of a single display controller 404. Each of the display controllers 405, 406, and 407 is configured to control one of the laser driver ICs 401, 402, and 403 according to a video input. Each display controller 405, 406, and 407 may select a respective video segment from the video input for further processing, including determining the relevant RGB value (e.g., pixel color) for a respective light transmission. Each display controller 405, 406, and 407 generates control information to send to a respective laser driver IC 401, 402, or 403 for use in a respective light beam transmission.

As indicated above, FIG. 4B is provided merely as an example. Other examples are possible and may differ from what was described with regard to FIG. 4B. For example, two or more devices shown in FIG. 4B may be implemented within a single device, or a single device shown in FIG. 4B may be implemented as multiple devices. Additionally, one or more of the devices of picture generation unit 400B may perform one or more functions described as being performed by another one or more devices of picture generation unit 400B.

In some situations, it may be possible for one or more issues to arise in the above-described multi-FOV setup. For example, the above-described multi-FOV setup may result in geometrical distortions and non-uniform brightness distribution within each FOV section, visual artifacts may occur when images are displayed across different FOV sections (overlapping zones), and the laser interface requires a much higher sample rate than the actual video stream to be displayed. The required higher sample rate may have an impact on design size, memory bandwidth, and power consumption of a display controller.

The following solutions may address these one or more issues. Some implementations may apply an inverse distortion and brightness distribution to RGB values of the image to be displayed. Some implementations may re-sample different FOV sections with an overscan (e.g., drive the RGB light generation units with brightness null in an overscan area). Some implementations may apply an inverse distortion and brightness correction to image frames before Lissajous re-sampling, at a sample rate that is lower than the video stream.

Figure 5:
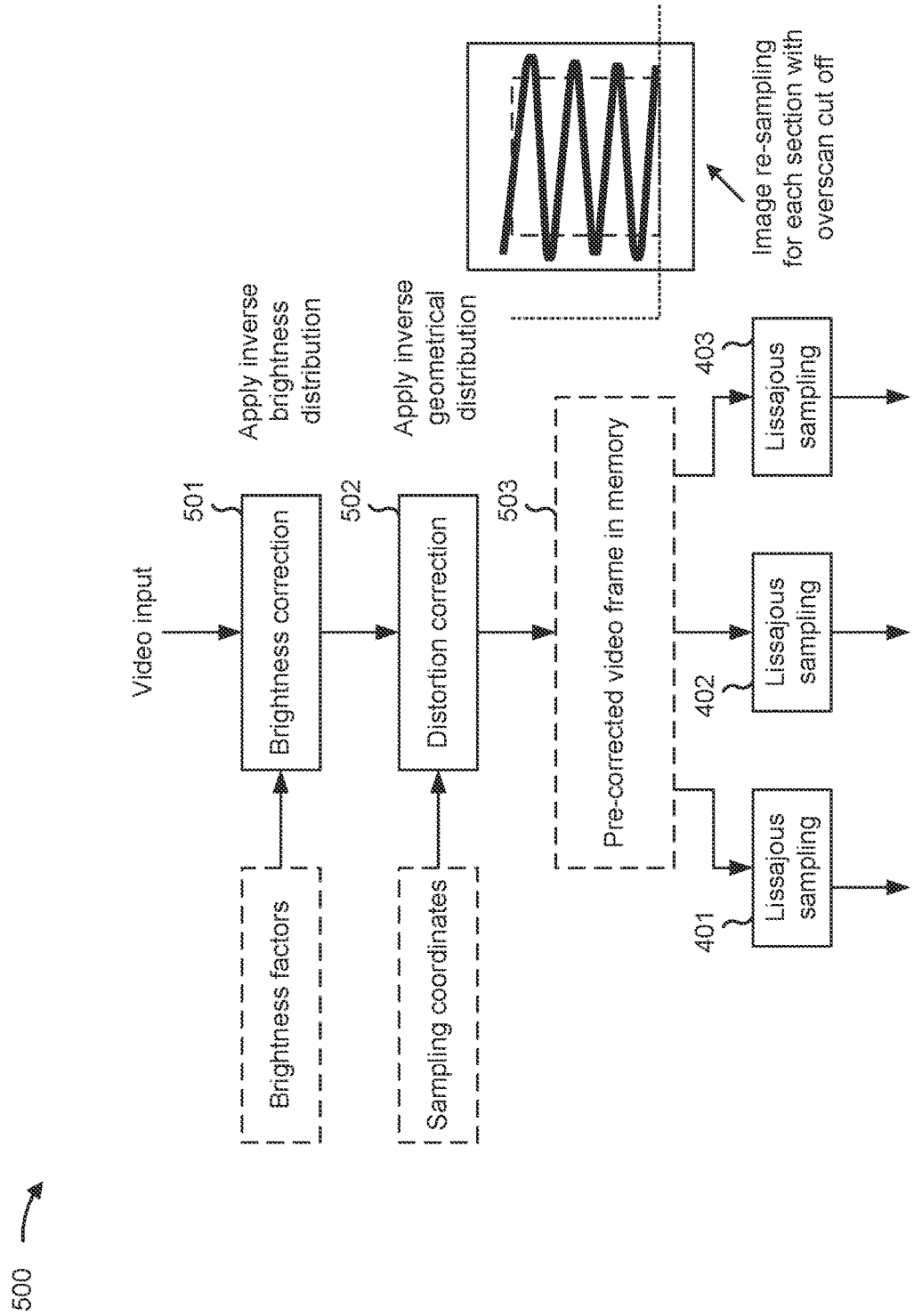
FIG. 5 illustrates a schematic block diagram of a compensation system according to one or more implementations.

FIG. 5 illustrates a block diagram of a compensation system 500 according to one or more implementations. The compensation system 500 may be implemented in the system controller 23, and, more specifically, in one or more display controllers 404-407. The compensation system 500 includes a brightness correction unit 501 implemented at least in part in hardware. For example, the brightness correction unit 501 may be implemented in a processor of display controller 404. One drawback of Lissajous scanning is that the MEMS mirrors 12*x*, 12*y*, and 12*xy* move fastest in the center of the oscillation and move slowest at the edges of the oscillation. For example, MEMS mirrors 12*x*, 12*y*, and 12*xy* slow down to change a scanning direction at the edges of their oscillations. When the output power of the transmitted RGB light beams is kept constant, this results in a higher brightness density at the edges and lower brightness density at the center of a FOV section FOV1, FOV2, or FOV3. Consequently, in order to keep the same brightness density over an entire FOV section FOV1, FOV2, or FOV3, and, thus, over the full FOV, the brightness correction unit 501 is configured to reduce the transmission power level at the edges of each FOV section FOV1, FOV2, and FOV3 and increase the transmission power level at the center of each FOV section FOV1, FOV2, and FOV3. In other words, by employing power modulation, the brightness correction unit 501 reduces the power output of each of the RGB light generation units 10-1, 10-2, and 10-3 as the RGB light generation units 10-1, 10-2, and 10-3 transmit at the edge regions of their respective FOV sections FOV1, FOV2, and FOV3 and increases the power output of each of the RGB light generation units 10-1, 10-2, and 10-3 as the RGB light generation units 10-1, 10-2, and 10-3 transmit at the center region of their respective FOV sections FOV1, FOV2, and FOV3.

This may be referred to as "inverse brightness correction." For example, if the brightness intensity at the outermost edge is twice the brightness intensity in the center when the output power of the transmitted RGB light beams is kept constant, the transmission power level should be adjusted to be half at the edges compared to the center when implementing inverse brightness correction.

Since the RGB light generation units 10-1, 10-2, and 10-3 simultaneously transmit at the same 2D coordinate within their respective FOV sections FOV1, FOV2, and FOV3, the transmission power level of the RGB light generation units 10-1, 10-2, and 10-3 may be synchronized and matched. Thus, the brightness correction unit 501 may synchronously adapt the transmission power levels of the RGB light generation units 10-1, 10-2, and 10-3 to have the same transmission power level at each transmission time (e.g., at each respective 2D coordinate) and change the transmission power level as the 2D MEMS mirror scanning system 310 changes its scanning position to target different 2D coordinates.

The brightness correction unit 501 is configured to receive a video input and receive brightness factors to be applied at corresponding 2D coordinates of a scanning pattern. The brightness correction unit 501 applies these brightness factors to the video input to generate a compensated video input.

The compensation system 500 includes a distortion correction unit 502 implemented at least in part in hardware. For example, the distortion correction unit 502 may be implemented in a processor of one or more display controllers 404-407. A 2D MEMS mirror scanning system may introduce some geometrical distortions, for example, a rectangle that is somewhat bent. The actual distortion may be recorded by a camera system and then an inverse distortion correction matrix may be calculated from the determined distortion. For example, a bottom-left corner of a FOV section FOV1, FOV2, or FOV3 is actually "bent" several pixels too far towards the bottom of the FOV section FOV1, FOV2, or FOV3. Thus, "inverse distortion correction" would lead to sampling several pixels above the current position to correct the distortion. The distortion correction unit 502 is configured to receive corrected sampling coordinates based on the inverse distortion correction matrix and apply the corrected sampling coordinates the video input to generate a compensated video input.

Overscan may also be used to adapt the sampling coordinates. Since, with constant laser-power, the actual density at the outermost edges is much higher than in the center, the full range over which the RGB light beams might cover is not used. Instead, a smaller scanning area within the full range may be used. The RGB light beams may be steered by the scanning structure into a FOV section having an area of A×B degrees, where A and B are integers. The compensation system 500 can reduce this area by several percent to leave the borders of each FOV section "unused." "Unused" means leaving RGB light generation units 10-1, 10-2, and 10-3 turned off in those unused areas, which is equal to laser power being set to zero or brightness null. For example, sampling coordinates in these border areas may be removed so that the RGB light beams are not triggered in the border areas of the FOV sections FOV1, FOV2, and FOV3.

The brightness factors and the inverse distortion correction are applied to a video frame or still image of the video input and the compensated image is stored in memory 503 of the compensation system 500 (e.g., in a memory device of display controller 404). The compensation system 500 then divides the compensated image into image segments according to the plurality of FOV sections FOV1, FOV2, and FOV3, with each FOV section mapped to one of the image segments for display. Thus, the corrections are done before Lissajous sampling by the laser driver ICs 401, 402, and 403 (e.g., before dividing the whole image into its plurality of FOV sections). This process has the benefit that the inverse brightness correction and the inverse distortion correction need not be individually performed on each of the divided image segments. Instead, the inverse brightness correction and the inverse distortion correction are each performed once on the full image before dividing the full image into image segments. The divided image segments have the inverse brightness correction and the inverse distortion correction factored in at the time the divided image segments are divided from the full image. This saves system resources, including processing resources and memory resources due to the fact that the corrections are performed once instead of being performed multiple times. This allows processing bandwidth to be allocated to other functions. Accordingly, each FOV section is scanned with brightness factors and inverse distortion correction applied to the compensated image.

As indicated above, FIG. 5 is provided merely as an example. Other examples are possible and may differ from what was described with regard to FIG. 5. For example, two or more devices shown in FIG. 5 may be implemented within a single device, or a single device shown in FIG. 5 may be implemented as multiple devices. Additionally, one or more of the devices of compensation system 500 may perform one or more functions described as being performed by another one or more devices of compensation system 500.

The foregoing disclosure provides illustration and description, but is not intended to be exhaustive or to limit the implementations to the precise form disclosed. Modifications and variations are possible in light of the above disclosure or may be acquired from practice of the implementations.

For example, although implementations described herein relate to MEMS devices with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPLAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software executing on hardware, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A picture generation system, comprising:
 a plurality of red-green-blue (RGB) light transmitters configured to synchronously generate respective pixel light beams and transmit the respective pixel light beams along respective transmission paths to be projected into a full field of view (FOV), wherein the full FOV is divided into a plurality of FOV sections that are respectively paired with a different one of the plurality of RGB light transmitters such that each of the plurality of RGB light transmitters transmits light into a respective area defined by a respective FOV section of the plurality of FOV sections;
 a scanning system arranged on each of the respective transmission paths of the plurality of RGB light transmitters, the scanning system comprising at least one scanning structure that enables the scanning system to simultaneously steer the respective pixel light beams into the plurality of FOV sections, wherein the scanning system is configured to direct each of the respective pixel light beams into a different one of the plurality of FOV sections according to a scanning pattern; and a controller configured to modulate a power output of each RGB light transmitter of the plurality of RGB light transmitters over the scanning pattern such that the power output of the plurality of RGB light transmitters is set lower when targeting edge regions of the plurality of FOV sections and the power output of the plurality of RGB light transmitters is set higher when targeting center regions of the plurality of FOV sections.

2. The picture generation system of claim 1, wherein:
the at least one scanning structure includes a first scanning structure that is configured to rotate about a first scanning axis for steering the respective pixel light beams in a first scanning direction and rotate about a second scanning axis for steering the respective pixel light beams in a second scanning direction, and
the first scanning structure is configured to simultaneously steer the respective pixel light beams into the plurality of FOV sections by directing each of the respective pixel light beams into a respective FOV section according to the scanning pattern.

3. The picture generation system of claim 2, wherein the plurality of RGB light transmitters are arranged relative to the first scanning structure such that each of the respective pixel light beams is directed to a same two-dimensional coordinate within a respective FOV section by the first scanning structure.

4. The picture generation system of claim 1, wherein the at least one scanning structure includes:
a first scanning structure configured to rotate about a first scanning axis for steering the respective pixel light beams in a first scanning direction; and
a second scanning structure configured to rotate about a second scanning axis for steering the respective pixel light beams in a second scanning direction,
wherein the first and the second scanning structures are configured to simultaneously steer the respective pixel light beams into the plurality of FOV sections by directing each of the respective pixel light beams into a respective FOV section according to the scanning pattern.

5. The picture generation system of claim 4, wherein the first scanning structure is configured to receive the respective pixel light beams from the plurality of RGB light transmitters and direct the respective pixel light beams to the second scanning structure, and the second scanning structure is configured to direct the respective pixel light beams into the plurality of FOV sections by directing each of the respective pixel light beams into a respective FOV section according to the scanning pattern.

6. The picture generation system of claim 5, wherein the plurality of RGB light transmitters are arranged relative to the first scanning structure such that each of the respective pixel light beams is directed to a same two-dimensional coordinate within a respective FOV section by the second scanning structure.

7. The picture generation system of claim 1, wherein the plurality of FOV sections are mutually exclusive of each other.

8. The picture generation system of claim 1, wherein neighboring FOV sections of the plurality of FOV sections share a common boundary.

9. The picture generation system of claim 1, wherein neighboring FOV sections of the plurality of FOV sections partially overlap.

10. The picture generation system of claim 1, wherein:
each of the plurality of RGB light transmitters is configured to transmit a respective sequence of pixel light beams such that a plurality of respective sequences of pixel light beams is generated by the plurality of RGB light transmitters and projected into the full FOV, and
transmission times of each of the plurality of respective sequences of pixel light beams are synchronized with each other.

11. The picture generation system of claim 10, wherein the scanning system directs each of the plurality of respective sequences of pixel light beams into a respective FOV section.

12. The picture generation system of claim 11, wherein the scanning system directs the plurality of respective sequences of pixel light beams according to a same scanning pattern within their respective FOV sections.

13. The picture generation system of claim 1, further comprising:
at least one controller configured to receive video information and control the plurality of RGB light transmitters based on the video information for generating a picture in the full FOV.

14. The picture generation system of claim 13, wherein:
the at least one controller is configured to divide the video information into video segments each corresponding to a respective FOV section of the plurality of FOV sections, wherein each video segment corresponds to a different one of the plurality of RGB light transmitters, and
the at least one controller is configured to control each of the plurality of RGB light transmitters to generate a respective pixel light beam according to a respective video segment of the video segments.

15. The picture generation system of claim 1, wherein each of the at least one scanning structure is a microelectromechanical system (MEMS) mirror.

16. The picture generation system of claim 1, wherein each of the at least one scanning structure is configured to oscillate at a respective resonance frequency about a respective scanning axis.

17. The picture generation system of claim 1, wherein the scanning pattern is a Lissajous scanning pattern.

18. A method of generating a picture on a full field of view (FOV), the method comprising:
synchronously transmitting, by a plurality of red-green-blue (RGB) light transmitters, respective pixel light beams along respective transmission paths to be projected into the full FOV, wherein the full FOV is divided into a plurality of FOV sections that are respectively paired with a different one of the plurality of RGB light transmitters such that each of the plurality of RGB light transmitters transmits light into a respective area defined by a respective FOV section of a plurality of FOV sections;
simultaneously steering, by a scanning system, the respective pixel light beams into the plurality of FOV sections, including directing each of the respective pixel light beams into a different one of the plurality of FOV sections according to a scanning pattern; and modulating a power output of each RGB light transmitter of the plurality of RGB light transmitters over the scanning pattern such that the power output of the plurality of RGB light transmitters is set lower when targeting edge regions of the plurality of FOV sections and the power output of the plurality of RGB light transmitters is set higher when targeting center regions of the plurality of FOV sections.

19. The method of claim 18, wherein the plurality of RGB light transmitters are arranged relative to the scanning system such that each of the respective pixel light beams is directed to a same two-dimensional coordinate within a respective FOV section by the scanning system.

20. The method of claim 18, further comprising:
transmitting, by each of the plurality of RGB light transmitters, a respective sequence of pixel light beams such that a plurality of respective sequences of pixel light beams is generated by the plurality of RGB light transmitters and projected into the full FOV, wherein transmission times of each of the plurality of respective sequences of pixel light beams are synchronized with each other.

21. The picture generation system of claim 1, wherein the controller is configured to modulate the power output of each RGB light transmitter of the plurality of RGB light transmitters over the scanning pattern such that each RGB light transmitter of the plurality of RGB light transmitters provides a constant brightness density throughout an entirety of the scanning pattern within a respective FOV section of plurality of FOV sections.

22. The picture generation system of claim 21, wherein the controller is configured to synchronously adapt the power output of each RGB light transmitter of the plurality of RGB light transmitters over the scanning pattern to have a same transmission power level at each transmission time.

23. The picture generation system of claim 21, wherein the controller is configured to apply inverse distortion correction prior to transmitting the respective pixel light beams.

* * * * *